(12) United States Patent
Lavender et al.

(10) Patent No.: US 11,932,407 B2
(45) Date of Patent: Mar. 19, 2024

(54) DISCONNECT ASSEMBLY

(71) Applicant: IrvinGQ Limited, Llangeinor (GB)

(72) Inventors: Mark Hywel Lavender, Chippenham (GB); Richard Anthony Laws, Coity (GB)

(*) Notice: Subject to any disclaimer, the term of this patent is extended or adjusted under 35 U.S.C. 154(b) by 765 days.

(21) Appl. No.: 17/002,699

(22) Filed: Aug. 25, 2020

(65) Prior Publication Data

US 2021/0070454 A1    Mar. 11, 2021

(30) Foreign Application Priority Data

Sep. 5, 2019 (GB) ..................... 1912764

(51) Int. Cl.
| | |
|---|---|
| *B64D 17/38* | (2006.01) |
| *B60P 7/08* | (2006.01) |
| *B64D 9/00* | (2006.01) |
| *B64D 17/58* | (2006.01) |
| *F16B 1/02* | (2006.01) |

(52) U.S. Cl.
CPC ............... *B64D 17/38* (2013.01); *B60P 7/08* (2013.01); *B64D 9/00* (2013.01); *B64D 17/58* (2013.01); *F16B 1/02* (2013.01)

(58) Field of Classification Search
CPC .......... B64D 17/38; B64D 17/58; B64D 9/00; B60P 7/08; F16B 1/02
USPC .................. 294/82.25, 82.24, 82.26
See application file for complete search history.

(56) References Cited

U.S. PATENT DOCUMENTS

| | | | | |
|---|---|---|---|---|
| 2,784,938 | A * | 3/1957 | Richard ................ | B60P 3/073 410/23 |
| 3,393,001 | A * | 7/1968 | Beckwith, Jr. ....... | B64D 17/383 294/82.25 |
| 4,247,143 | A * | 1/1981 | Putman ................ | B64D 17/38 367/4 |
| 5,687,931 | A * | 11/1997 | Hogan ................. | B64D 17/38 244/151 B |
| 6,189,834 | B1 | 2/2001 | Dietz et al. | |
| 6,883,756 | B2 * | 4/2005 | Preston ................ | B64D 17/58 244/150 |

(Continued)

FOREIGN PATENT DOCUMENTS

| | | |
|---|---|---|
| KR | 101651906 B1 | 9/2016 |
| WO | 2007100315 A2 | 9/2007 |

OTHER PUBLICATIONS

Intention to Grant, dated Apr. 4, 2023, GB Patent Application No. 1912764.6.

(Continued)

*Primary Examiner* — Paul T Chin
(74) *Attorney, Agent, or Firm* — LeonardPatel PC (57) ABSTRACT

A disconnect assembly for disconnecting a payload from a delivery platform includes a disconnect device for providing a releasable connection between the payload and the delivery platform. The disconnect assembly also includes an actuation mechanism for actuating release of the releasable connection, and a trigger mechanism for triggering the actuation mechanism to release the releasable connection. The trigger mechanism is automated such that the trigger mechanism can trigger the actuation mechanism without requiring operator intervention at the trigger mechanism. Also provided is a kit of parts, a delivery apparatus and a method of disconnecting a payload from a delivery platform.

14 Claims, 8 Drawing Sheets

(56) References Cited

U.S. PATENT DOCUMENTS

| | | | | |
|---|---|---|---|---|
| 8,191,831 B2* | 6/2012 | Nadir | .................... | B64D 17/80 |
| | | | | 244/149 |
| 8,414,235 B2 | 4/2013 | Parkinson | | |
| 8,870,123 B2* | 10/2014 | Deazley | ................ | B64D 17/62 |
| | | | | 244/149 |
| 9,771,159 B1* | 9/2017 | Grenga | ................. | B64D 17/38 |
| 10,287,022 B2* | 5/2019 | Lloyd | ................... | B64D 17/38 |
| 10,512,799 B2* | 12/2019 | Fitzgerald | .............. | B64D 17/32 |
| 11,130,584 B2* | 9/2021 | Jones | ..................... | F16B 21/12 |
| 11,434,011 B1* | 9/2022 | Costello | ................ | B64D 17/38 |
| 2005/0001099 A1* | 1/2005 | Auvray | ................. | B64D 17/38 |
| | | | | 244/151 A |
| 2009/0127397 A1* | 5/2009 | Hyunh | ................ | B64D 17/383 |
| | | | | 244/152 |
| 2022/0267004 A1 | 8/2022 | Truslow et al. | | |

OTHER PUBLICATIONS

Examination Report, dated Nov. 30, 2022, GB19127464.6.
Hilary L. Gutman, "Non-Final Office Action", dated Jan. 16, 2024, U.S. Appl. No. 17/226,733.

\* cited by examiner

DISCONNECT ASSEMBLY

CROSS-REFERENCE TO RELATED APPLICATION

This application claims the benefit of, and priority to, GB Patent Application No. 1912764.6, filed on Sep. 5, 2019. The subject matter thereof is hereby incorporated herein by reference in its entirety.

FIELD

Some embodiments of the present invention generally relate to disconnect assemblies, and more particularly, to a disconnect assembly for disconnecting a payload from a delivery platform.

BACKGROUND

Conventionally, a payload may be "lashed" on top of a delivery platform by one or more lashings. These lashings are designed to be removed/released by an operator (on land or at sea) when the payload is to be used. For example, if a platform is used to deliver a payload by parachute aerial delivery, the payload is released from the platform when an operator reaches the platform, after it has landed. For example, the payload may be a ground vehicle that is then driven off the platform, once released from it.

The lashing release may involve the release of a ratchet handle. The ratchet handle is used to control the effective length of the lashing loop by increasing or decreasing the amount of the loose end, and therefore changing the tension in the lashing loop. The ratchet handle may comprise a release setting to release the ratchet so the loose end can be pulled out and the lashing released. However, this may take a significant amount of time to do. This is disadvantageous, especially where the platform has been delivered to a hostile location.

An alternative way of releasing a lashing maybe to release a tensioning lever. However, again, this may take longer than desired, especially if in a hostile location.

For expediency, and to minimise the time taken to release the payload, the releasing is often done by cutting through a lashing strap to release it. Of course, once this is done, the lashing cannot be re-used. This means that new lashings, and the associated expense, are required. Of course, the time to release the lashing, even when cut, can still be significant, especially where the lashing is particularly sturdy.

In addition, the time to release all lashings when there is more than one, particularly a large number, of lashings to release, can be especially significant.

Accordingly, an alternative that mitigates the above-mentioned problems may be desired. Additionally, an improved disconnect assembly may be beneficial to resolve the above-mentioned problems.

SUMMARY

Certain embodiments of the present invention may be implemented and provide solutions to the problems and needs in the art that have not yet been fully solved by conventional disconnect assemblies. For example, some embodiments of the present invention pertain to a disconnect assembly for disconnecting a payload from a delivery platform. The disconnect assembly may include a disconnect device that provides a releasable connection between the payload and the delivery platform, and an actuation mechanism that actuates release of the releasable connection. Some embodiments may also pertain to a kit of parts, a delivery apparatus and a method of disconnecting a payload from a delivery platform.

BRIEF DESCRIPTION OF THE DRAWINGS

Embodiments of the present invention will now be described by way of example only with reference to the accompanying schematic drawings of which.

DETAILED DESCRIPTION OF THE EMBODIMENTS

Figure 1:
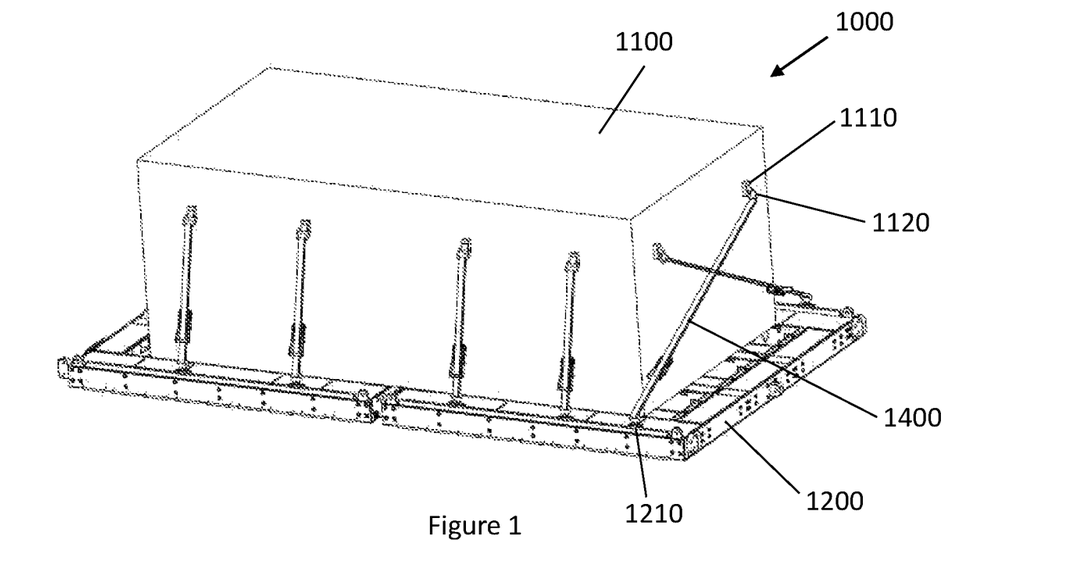
FIG. 1 shows a perspective view of an aerial delivery apparatus, according to a first embodiment of the invention.

FIG. 1 shows a perspective view of an aerial delivery apparatus 1000, according to a first embodiment of the invention. The delivery apparatus 1000 comprises a payload 1100 attached to an upper surface of a hinged aerial delivery platform 1200, such as that described in EP 3006335. The delivery apparatus 1000 also includes a delivery mechanism, comprising a parachute (not shown in FIG. 1) attached to the payload 1100. The parachute may be attached using a disconnect device, as described in EP 3505447.

The payload 1100 is attached to and lashed onto the platform 1200 using a plurality (twelve–six of which shown in FIG. 1) of lashings 1400 distributed around the payload 1100. Each lashing 1400 connects a part of the payload 1100 to a part of the platform 1200. In particular, for each lashing 1400, there is a lashing attachment bracket 1110 attached to the payload 1100, which provides a lashing connection loop 1120. Also, for each lashing 1400, there is a lashing connection buckle 1210 attached to the platform 1200, which has a lashing connection slot 1220.

Figure 2:
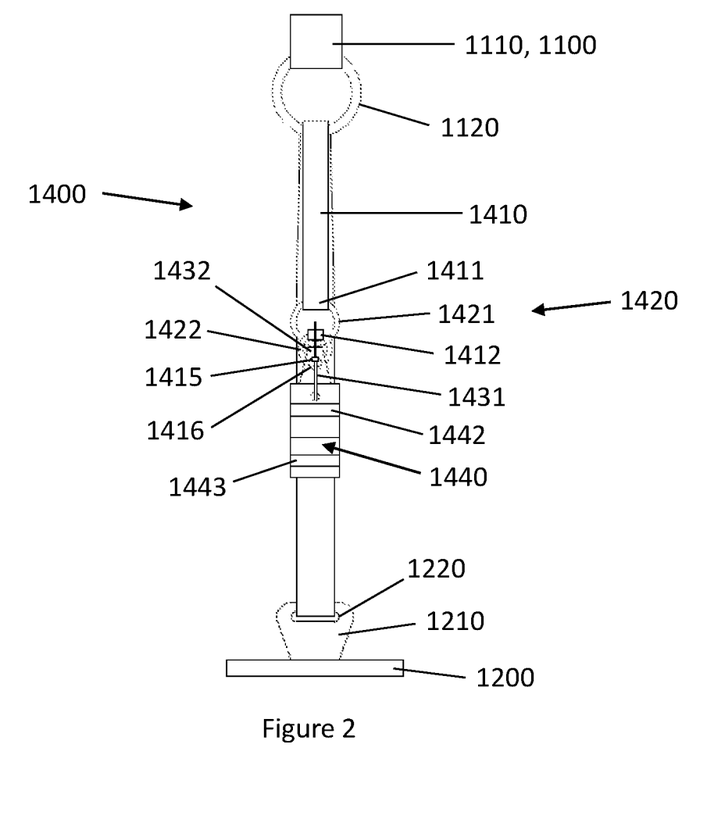
FIG. 2 shows an enlarged schematic view of the lashing of FIG. 1.

Each lashing 1400 extends between the corresponding lashing connection loop 1120 and the corresponding lashing connection slot 1120, as shown in FIG. 2. The lashing 1400 is looped through the lashing connection loop 1120 and the lashing connection slot 1220 and provided with a releasable connection to attach a first end portion 1411 of the lashing to a second end portion 1412 of the lashing 1400 to secure the lashing in place.

Each lashing 1400, as shown by FIG. 2, is in the form of a strap with the first end portion 1411 attached to a large ring 1421 of a 3-ring release mechanism 1420. The second end portion 1412 is attached to a medium ring 1422 of the 3-ring release mechanism 1420. Adjacent the second end portion 1412, and as better shown in FIG. 3, there is a strap 1413 attached to the lashing 1400. The distal end of the strap 1413 (further away from the lashing 1400) is attached to a small ring 1423 of the 3-ring release mechanism 1420.

Figure 3:
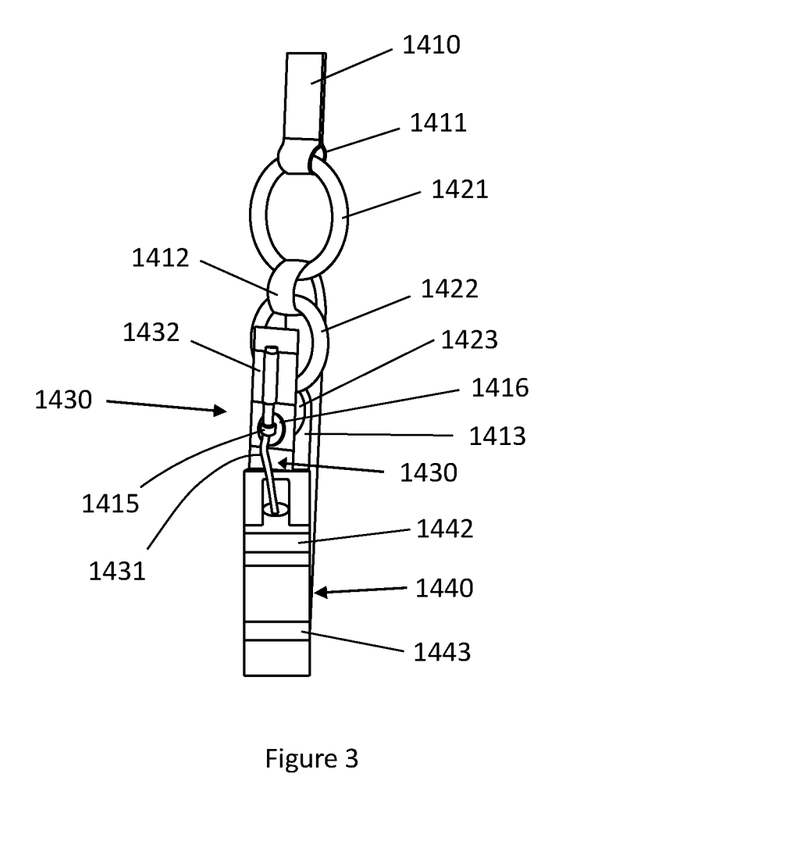
FIG. 3 shows an alternative view of the lashing of FIG. 1.

The 3-ring release mechanism 1420 is arranged, as is conventional for such a 3-ring release mechanism, with the medium ring 1422 having been passed through the large ring 1421, such that the second end portion 1412 of the lashing 1400 is looped over the large ring 1421. The small ring 1423 has been passed through the medium ring 1422, such the strap 1413 has been looped over the medium ring 1422.

A small loop 1415 attached to the lashing 1400 adjacent the strap 1413 is passed through the small ring 1423 and then passed through a small hole 1416 in the lashing 1400 adjacent the strap 1413. The small loop 1415 is prevented from coming back through the hole 1416 by an actuation mechanism 1430, which will be described later.

Hence, the small ring 1423 is held in place in relation to the strap 1413 and the second end portion 1412, and so the medium ring 1422 is prevented from slipping over the small ring 1423 and held in place in relation to the second end portion 1412. Because of this, the large ring 1421 is prevented from slipping over the medium ring 1422 and the first end portion 1411 is thus held in place with the second end portion 1412. Hence, the lashing 1400 can secure the payload 1100 to the platform 1200.

The actuation mechanism 1430 that secures the small loop 1415 through the hole 1416 comprises a Teflon actuation cable 1431, which is passed through the small loop 1415. The actuation cable 1431 is attached at one end to a trigger mechanism 1440, which will be described later. At an opposite end, the cable 1431 is secured with a securing tab 1432 to prevent inadvertent release of the actuation cable 1431 from the small loop 1415.

The trigger mechanism 1440 is secured to the lashing 1400 by two securing tabs 1442, 1443, as shown in FIGS. 2 and 3.

Figure 5:
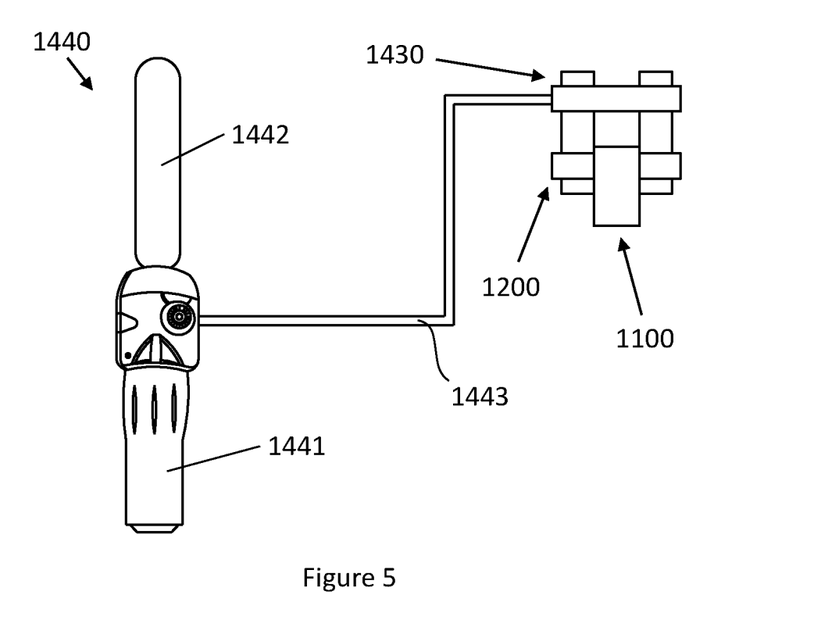
FIG. 5 shows a schematic view of a trigger mechanism for use with the delivery apparatus of FIG. 1 and the method of FIG. 4.

FIG. 5 shows a schematic view of a trigger mechanism 1400 for use with a delivery apparatus similar to FIG. 1. The trigger mechanism comprises a water activation cartridge (e.g. the United Moulders Ltd (UML) Mk5) 1441. Upon contact with water, the cartridge 1441 causes a connected gas cylinder 1442 to release compressed gas via gas line 1443. The gas line 1443 is connected to jaws (not shown) of an actuation mechanism 1430. Hence, when compressed gas is released, the payload 1100 is released from the platform 1200. (In other embodiments, the gas line 1443 could be used to release the actuation cable 1431 from the small loop 1415, in FIG. 1.)

Figure 6:
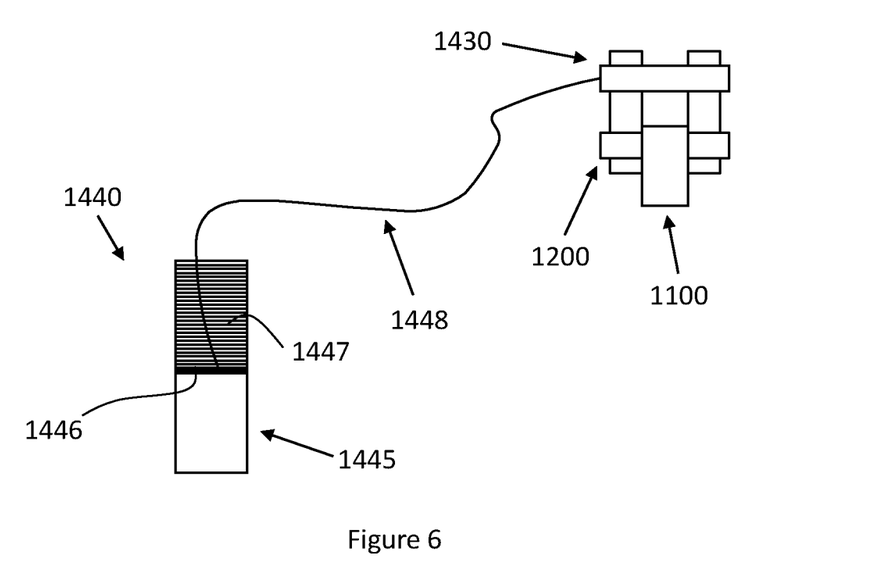
FIG. 6 shows a schematic view of an alternative trigger mechanism for use with the delivery apparatus of FIG. 1 and the method of FIG. 4.

FIG. 6 shows a schematic view of an alternative trigger mechanism 1400 for use with the delivery apparatus of FIG. 1. Here, the trigger mechanism 1400 comprises a water activation cylinder 1445 including a paper disc plate 1446 connected to a release cable 1448. The release cable 1448 is connected to one side of the paper disc plate 1446 and extends out of the cylinder at the corresponding end of the cylinder and connects to the actuation cable 1431. The paper disc plate 1446 is urged towards an opposite end of the cylinder by a spring 1447. Upon contact with water, a paper disc of the plate 1446 is burst, which allows the spring 1447 to urge the plate 1446 and release cable 1448 to the opposite end of the cylinder. Hence, the release cable 1448 and the actuation cable 1431 are pulled, causing the actuation cable 1431 to pull out of the small loop 1415.

Figure 4:
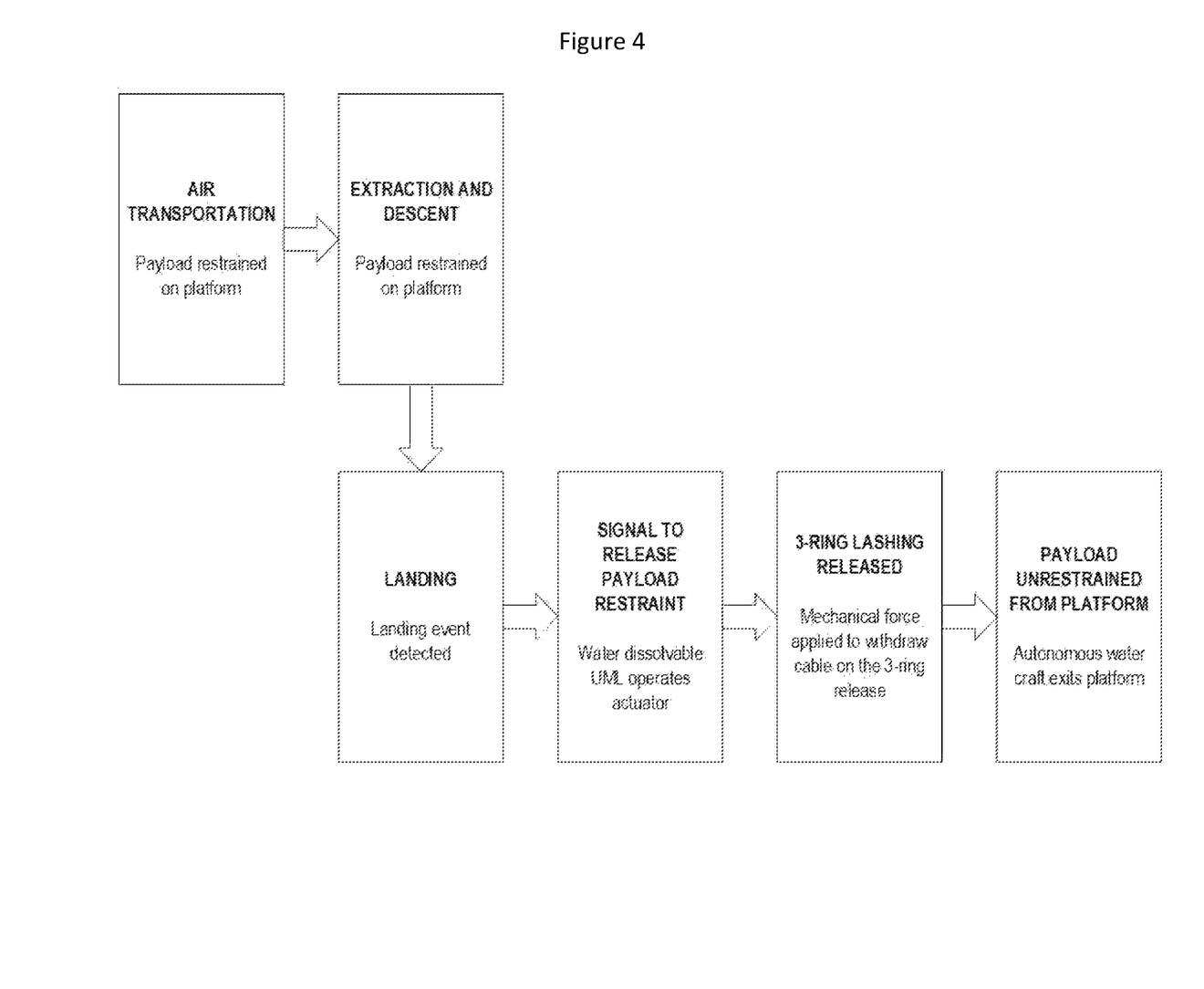
FIG. 4 illustrates the method of releasing the payload of FIG. 1.

FIG. 4 illustrates the method of releasing the payload of, or similar to, FIG. 1, using a different trigger mechanism. Here, the trigger mechanism used is the same as the detector device, including a water sensor device, described in EP 3505447 and shown in FIGS. 3a to 3d of that document. In particular, there is a trigger sleeve attached to a trigger plate in the water sensor device. The water sensor device also has two water sensor cartridges. Each water sensor "UML" cartridge has a water chamber, into which water can enter, and which contains a paper annulus that is softened and ruptures when water is detected. Each cartridge has a corresponding plunger restrained by the corresponding paper annulus. The plunger acts on a detector rod and each rod is attached to the trigger plate. When water is detected by a paper annulus, the corresponding rod is pushed about 5 mm under the action of the plunger and a spring. This causes the plate to move towards the trigger sleeve. If both annuli are ruptured, both rods are pushed back, and the trigger plate is pushed on both sides towards the trigger sleeve. If only one paper annulus is ruptured, only one rod moves. However, a fulcrum action on the inside of the water sensor device causes the plate to pivot so as to still push against the trigger sleeve.

For initial air transportation, for example on an aircraft, the payload 1100 is restrained on top of the platform 1200 by the twelve lashings 1400. When the delivery apparatus 1000 is extracted from the aircraft and descends (using a parachute), the payload 1100 is still restrained on the platform 1200 by the lashings 1400.

Once the delivery apparatus 1000 has landed on water, this is detected by the trigger mechanism described above. This causes the actuation cable 1431 to be pulled out from the small loop 1415. Hence, the small ring 1423 can slip through the medium ring 1422 and the medium ring 1422 can slip out of the large ring 1421 to release the lashings 1400 and release the payload 1100 from the platform 1200.

The payload 1100 may be an autonomous watercraft and hence the autonomous watercraft can move away from the platform 1200 to fulfil a desired mission, for example.

Figure 7:
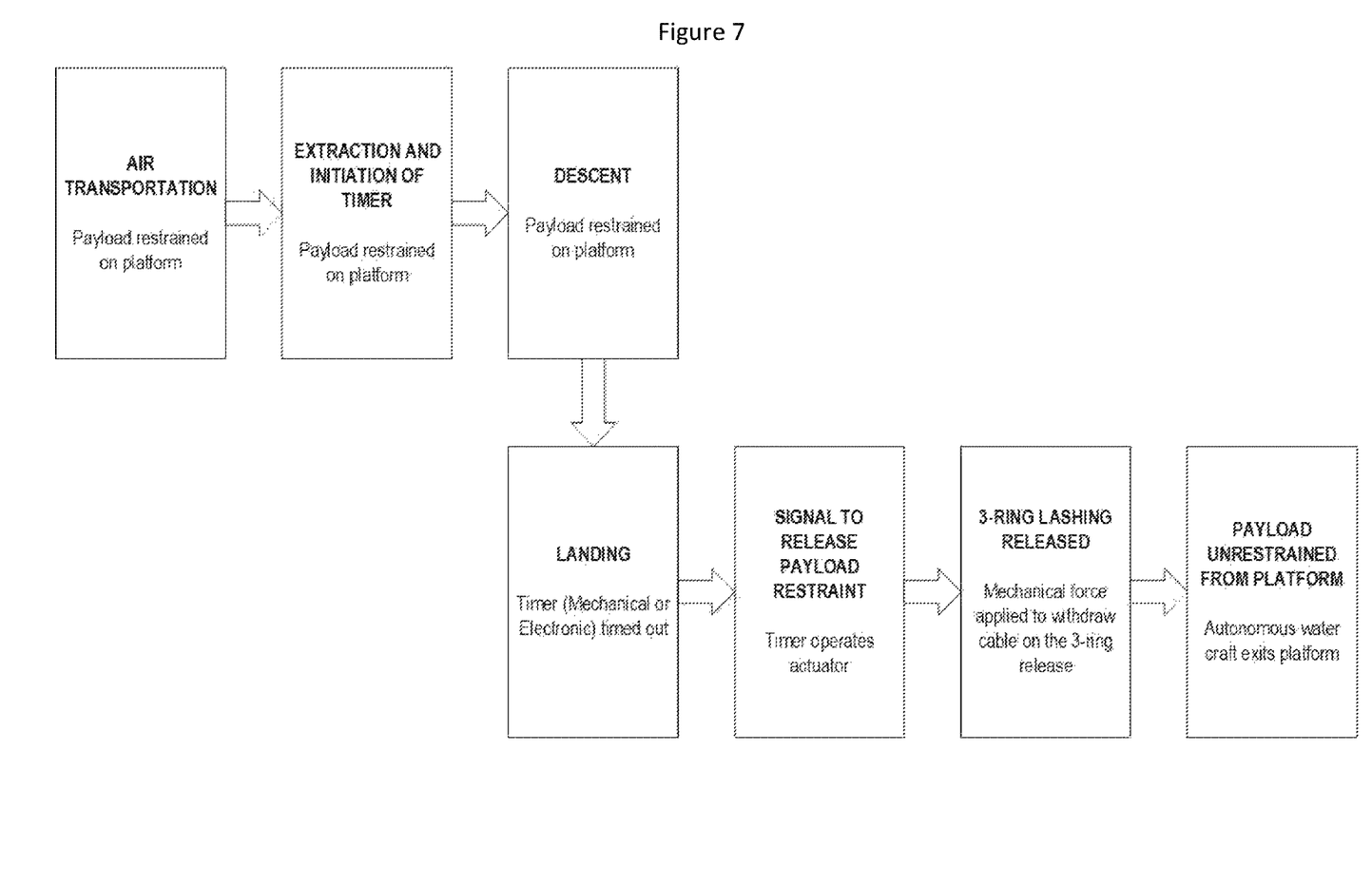
FIG. 7 illustrates a method of releasing the payload of FIG. 1, using a timer.

FIG. 7 illustrates an alternative method of releasing the payload of FIG. 1, using a timer. Here, a different trigger mechanism 1400 is provided to the apparatus of FIG. 5 or 6 (or as described in relation to FIG. 4), in the form of a mechanical or electronic timer.

For initial air transportation, for example on an aircraft, the payload 1100 is restrained on the platform 1200 by the twelve lashings 1400. When the delivery apparatus 1000 is to be extracted from the aircraft, the timer is set for an estimated descent time (plus a buffer to prevent release mid-air). The delivery apparatus is then extracted from the aircraft and descend (using a parachute). During this time, the payload 1100 is still restrained on the platform 1200 by the lashings 1400.

Once the timer has run out (which should be after the delivery apparatus 1000 has landed, for example, on water) the actuation cable 1431 is pulled out from the small loop 1415 on each lashing. Hence, the small ring 1423 can slip through the medium ring 1422 and the medium ring 1422 can slip out of the large ring 1421 to release the lashings 1400 and release the payload 1100 from the platform 1200.

The payload 1100 may be an autonomous watercraft and hence the autonomous watercraft can move away from the platform 1200 to fulfil a desired mission, for example.

Figure 8:
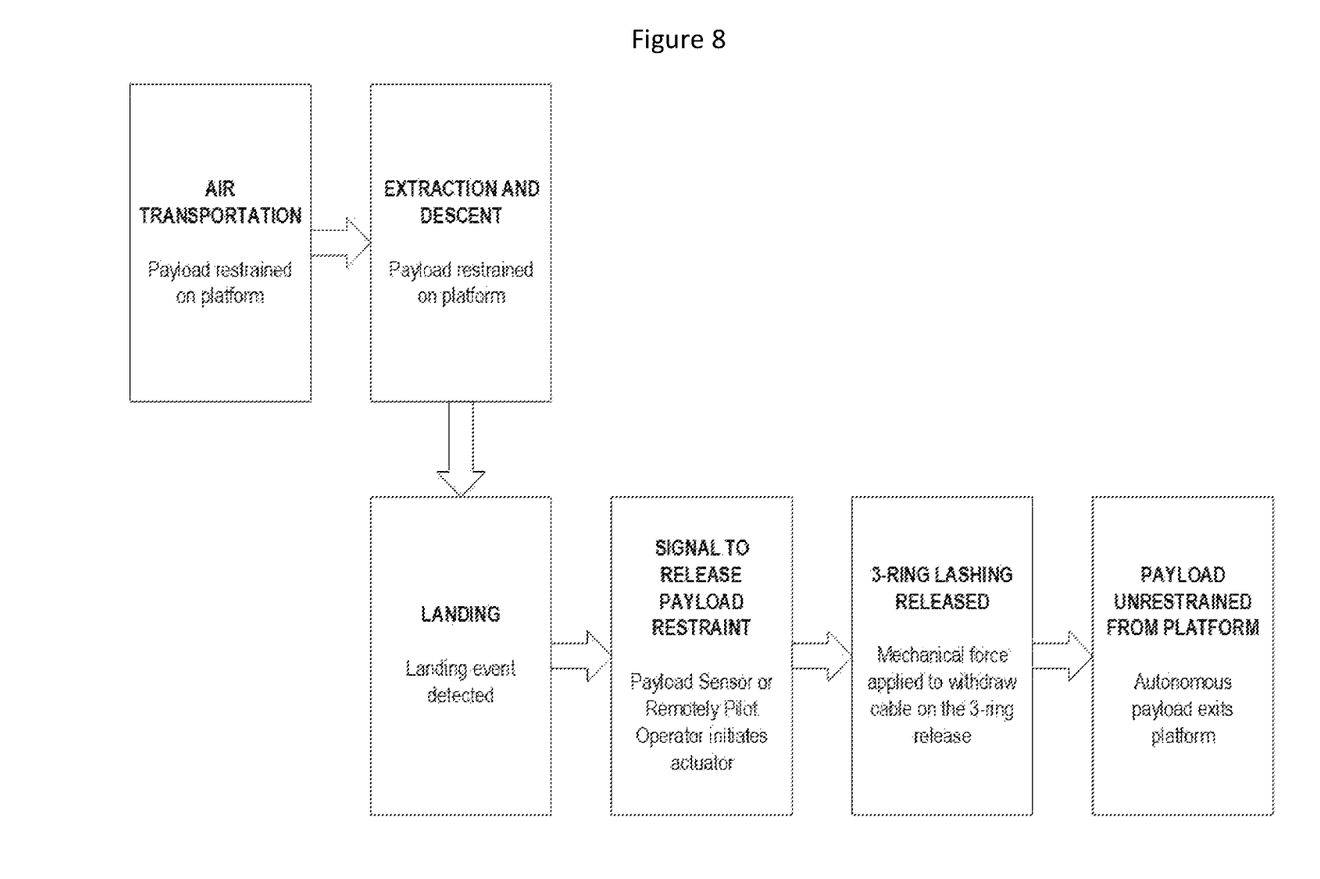
FIG. 8 illustrates a method of releasing the payload of FIG. 1, using a landing signal.

FIG. 8 illustrates a method of releasing the payload of FIG. 1, using a landing signal. Here, a different trigger mechanism 1400 is provided to the apparatus of FIG. 5 or 6 (or as described in relation to FIG. 4), in the form of a signal receiver.

For initial air transportation, for example on an aircraft, the payload 1100 is restrained on the platform 1200 by the twelve lashings 1400. When the delivery apparatus 1000 is extracted from the aircraft and descends (using a parachute), the payload 1100 is still restrained on the platform 1200 by the lashings 1400.

Once the delivery apparatus 1000 has landed, for example, on land, a remote pilot station or a sensor on the payload 1100 may detect this and send a "landing signal" to the signal receiver of the trigger mechanism 1400. This causes the actuation cable 1431 to be pulled out from the small loop 1415 on each lashing. Hence, the small ring 1423 can slip through the medium ring 1422 and the medium ring 1422 can slip out of the large ring 1421 to release the lashings 1400 and release the payload 1100 from the platform 1200.

The payload 1100 may be an autonomous ground vehicle and hence the autonomous vehicle can move away from the platform 1200 to fulfil a desired mission, for example.

Figure 9:
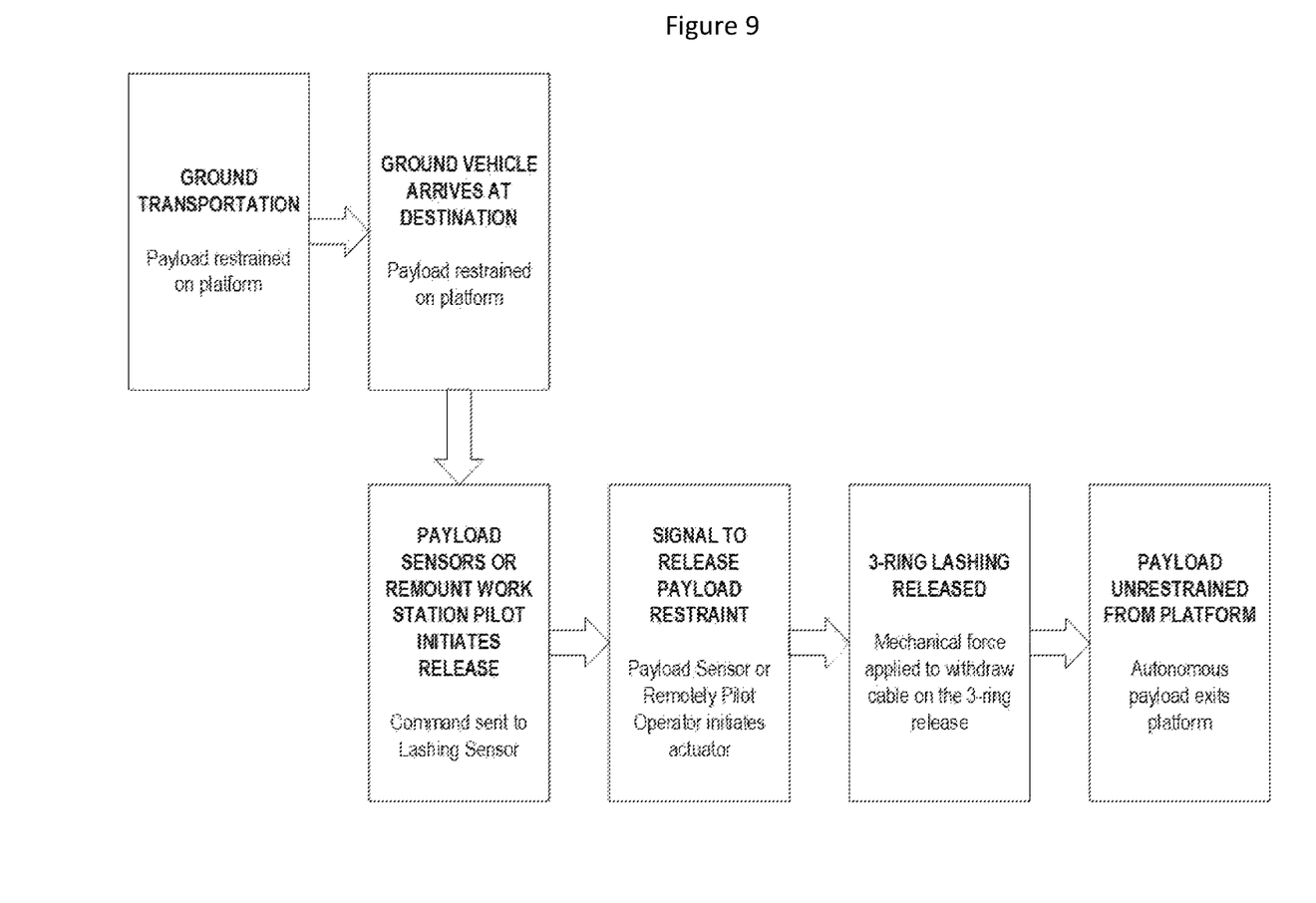
FIG. 9 illustrates a method of releasing a payload from a ground delivery apparatus, similar to that of FIG. 1, using a destination signal.

FIG. 9 illustrates a method of releasing a payload from a ground delivery apparatus, similar to that of FIG. 1, using a destination signal. Here, the delivery apparatus 1000 includes a ground vehicle delivery mechanism (rather than a parachute). Here, a different trigger mechanism 1400 is provided to the apparatus of FIG. 5 or 6 (or as described in relation to FIG. 4), in the form of a signal receiver.

During initial ground transportation, the payload 1100 is restrained on the platform 1200 by the twelve lashings 1400 until the desired destination is reached.

Once the delivery apparatus 1000 has arrived at the destination, a remote pilot station or a sensor on the payload 1100 may detect this and send a "destination signal" to the signal receiver of the trigger mechanism 1400. This causes the actuation cable 1431 to be pulled out from the small loop 1415 on each lashing. Hence, the small ring 1423 can slip through the medium ring 1422 and the medium ring 1422 can slip out of the large ring 1421 to release the lashings 1400 and release the payload 1100 from the platform 1200.

The payload 1100 may be an autonomous ground vehicle and hence the autonomous vehicle can move away from the platform 1200 to fulfil a desired mission, for example.

Figure 10:
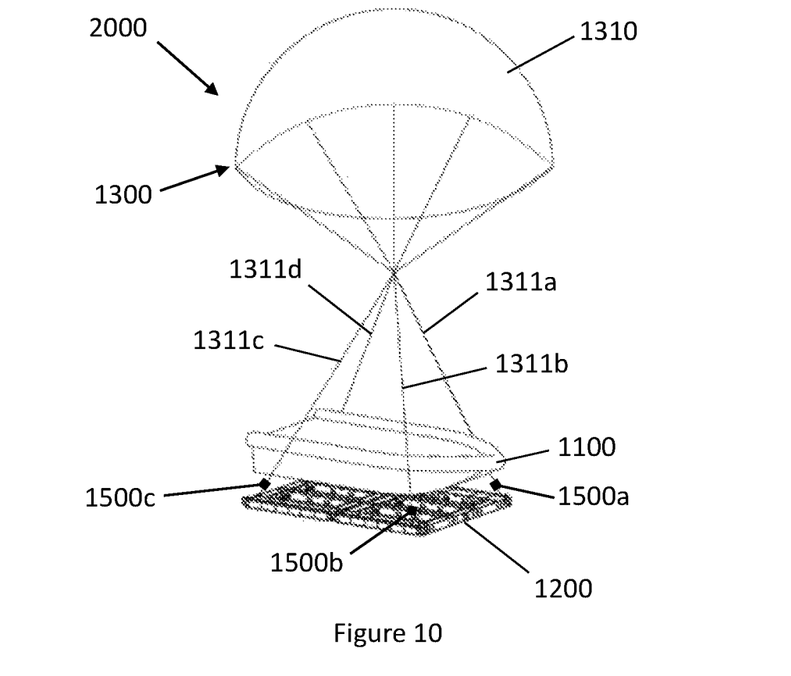
FIG. 10 shows a perspective view of an alternative aerial delivery apparatus.

FIG. 10 shows a perspective view of an alternative aerial delivery apparatus 2000. The delivery apparatus is similar to the apparatus 1000 described in relation to FIG. 1, and the same reference numerals will be used for similar elements. Here, the delivery mechanism 1300, in the form of a parachute 1310, is shown. The parachute 1310 comprises four attachment lines 1311a, 1311b, 1311c and 1311d, connected to the platform 1200. Here, it can be seen that the payload 1100 is an autonomous watercraft. The payload 1100 is connected to the platform 1200 as before and will not be described again.

Additionally, the four parachute attachment lines 1131 are each provided with a parachute disconnect assembly 1500 (three of which are shown—1500a, b and c) to detach the parachute 1310 from the platform 1200. The disconnect assemblies 1500 may be similar to that described above, in relation to the releasable connection of the payload and platform (e.g. including lashing with a 3-ring release, release by remote/payload signal, sensor/detection and/or timer) or may be similar to as described in EP 3505447.

Figure 11:
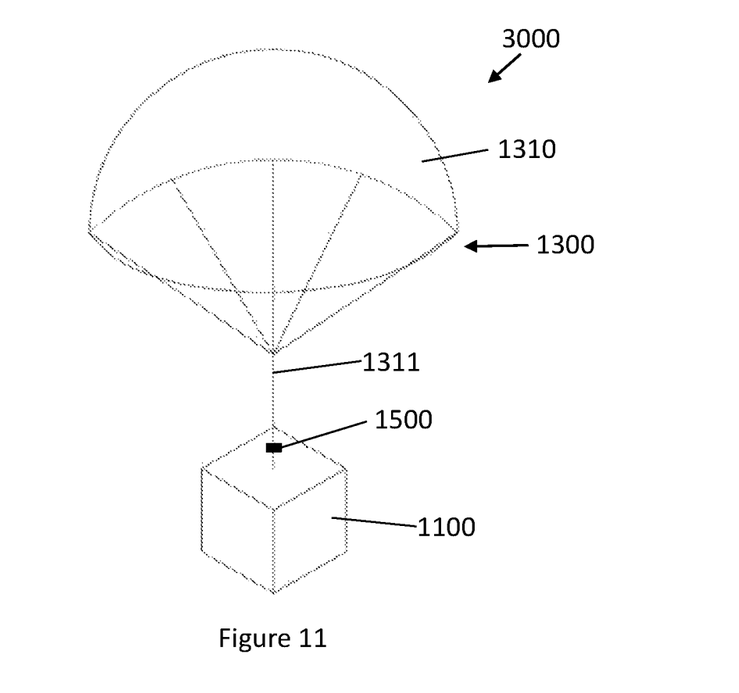
FIG. 11 shows a perspective view of a further alternative aerial delivery apparatus.

FIG. 11 shows a perspective view of a further alternative aerial delivery apparatus 3000. The delivery apparatus is similar to the apparatus 1000 described in relation to FIG. 1, and the same reference numerals will be used for similar elements. Here, the delivery mechanism 1300, in the form of a parachute 1310, is shown. The parachute 1310 comprises one attachment line 1311, connected to the payload 1100.

The parachute attachment line 1131 is provided with a parachute disconnect assembly 1500 to detach the parachute 1310 from the payload 1100. The disconnect assembly 1500 may be similar to that described above, in relation to the releasable connection of the payload and platform (e.g. including lashing with a 3-ring release, release by remote/payload signal, sensor/detection and/or timer) or may be similar to as described in EP 3505447.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The delivery apparatus may be for air, marine or ground delivery. If a parachute, or other delivery mechanism, is used, it may be attached to the payload and/or platform.

Any suitable platform 1200 may be used. Any suitable payload 1100 may be used.

Any suitable releasable connection may be used.

The lashing 1400 may or may not be provided with a length adjuster to adjust the tension in the lashing to effectively secure the payload 1100 to the platform 1200.

Any suitable actuation mechanism 1430 may be used. If an actuation cable 1431 is used, it may be made of any suitable material.

A timer may be used to indicate landing (for aerial operations) or indicate a delivery apparatus reaching a desired destination (for ground or marine operations).

A sensor maybe used (such as a motion sensor, or location sensor) to detect the delivery apparatus has landed or otherwise arrived at the required destination.

The present invention provides, according to an embodiment, a disconnect assembly for disconnecting a payload from a delivery platform, the disconnect assembly comprising a disconnect device for providing a releasable connection between the payload and the delivery platform, an actuation mechanism for actuating release of the releasable connection, and a trigger mechanism for triggering the actuation mechanism to release the releasable connection, wherein the trigger mechanism is automated such that the trigger mechanism can trigger the actuation mechanism without requiring operator intervention at the trigger mechanism.

Having an automated trigger mechanism allows for the trigger mechanism to operate to trigger the actuation mechanism without human intervention. Hence, the release can be triggered and actuated prior to an operator approaching the payload, thus reducing the amount of time taken by the operator to access the payload. In addition, the release can be done, and a payload released in the absence of an operator at the location of the delivery. Hence, if the payload is an autonomous vehicle, the autonomous vehicle can operate (i.e. because it has been released from the platform) without any operator being required at the location of the delivery. Importantly, the trigger mechanism is able to operate to trigger the actuation mechanism without requiring an operator to be at the delivery location. Of course, an operator may be located remotely to send a signal to the trigger mechanism to trigger the actuation mechanism.

The disconnect device may comprise a first attachment portion for attaching to the payload, a second attachment portion for attaching to the delivery platform, and a releasable mechanism for releasably connecting the first and second attachment portions.

In certain embodiments, the trigger mechanism comprises a detection device for detecting that the payload should be disconnected from the delivery platform, such that the trigger mechanism can trigger the actuation mechanism in response to such detection.

Also, in certain embodiments, the detection device comprises a motion sensor for detecting that the payload is stationary after being delivered to a delivery location.

The detecting device may comprise a GPS locator for detecting that the payload is at a delivery location and/or detecting that the payload is stationary after being delivered to a delivery location.

The detecting device may detect landing from an aerial delivery. The detector device may comprise a trigger mechanism having a trigger plate, the trigger plate being moveable from a non-triggered position to a triggered position upon landing.

In some embodiments, the trigger mechanism comprises a timer device for timing an elapsed time, such that the trigger mechanism can trigger the actuation mechanism in response to the time elapsed reaching a predetermined set time.

For example, the elapsed time may be the time elapsed since the start of the delivery, for example, since being dropped from an aircraft during aerial delivery. The predetermined set time may be the expected time from the start of the elapsed time to when the platform arrives at a delivery location (optionally, including a buffer to allow for the time to delivery location being longer than expected).

The timer may be mechanical and/or electrical.

A timer device can often be provided at lower cost than a detector device.

In some embodiments, the trigger mechanism comprises a signal receiver for receiving a signal that the payload should be disconnected from the delivery platform, such that the trigger mechanism can trigger the actuation mechanism in response to such signal.

The signal receiver may be a wireless signal receiver for receiving a wireless signal, for example from a remote command station or the payload.

The signal receiver may be a wired signal receiver for receiving a signal, for example from the payload via a wired connection.

For example, the payload may comprise a timer device, or detection device, for indicating that the payload should be disconnected from the delivery platform, similar to as described above, and the payload may then send a signal to the signal receiver of the trigger mechanism that the payload should be disconnected from the delivery platform.

In some embodiments, the disconnect assembly comprises a tension strapping for, under tension, lashing a payload to (an upper surface of) a delivery platform, the tension strapping being provided with the disconnect device, such that the disconnect device provides the releasable connection to release tension of the strapping.

The tension strapping may have an adjustable length so that the tension of the strapping can be adjusted, for example, for lashing different sized or shaped payloads, and/or lashing to different platforms and/or lashing to different parts of the platform. In use, the strapping is arranged to secure the payload to the platform and then the length adjusted to ensure the strapping is under tension to lash the payload against and to the platform.

In some embodiments, the releasable connection comprises a 3-ring releasable mechanism and wherein the actuation mechanism comprises an actuator for removing an actuator cable from a first ring of the 3-ring releasable mechanism.

They may be a plurality, for example between 4 and 20, of such releasable connections between the payload and platform. Each releasable connection may be actuated by an actuation mechanism, which is triggered by a, or the, trigger mechanism.

In some embodiments, the delivery platform is suitable for delivery during aerial, ground or marine operations. The platform may be generally planar.

For example, the delivery platform may be suitable for connection to a parachute for aerial delivery operations.

According to another embodiment of the invention there is also provided a kit of parts for assembling a disconnect assembly, for disconnecting a payload from a delivery platform, the kit of parts comprising a disconnect device for providing a releasable connection between the payload and the delivery platform, an actuation mechanism for actuating release of the releasable connection, and a trigger mechanism for triggering the actuation mechanism to release the releasable connection, wherein the trigger mechanism is automated such that the trigger mechanism can trigger the actuation mechanism without requiring operator intervention at the trigger mechanism.

According to yet another embodiment of the invention there is also provided a delivery apparatus comprising a delivery platform, a payload attached to the delivery platform, and a disconnect assembly providing a releasable connection between the payload and the delivery platform, as described above.

In some embodiments, the delivery apparatus further comprises a delivery mechanism, for attaching to the delivery platform and delivering the delivery platform to a delivery location.

The delivery mechanism may be a parachute for aerial delivery operations. It may be a ground vehicle for ground delivery operations. It may be a marine vessel for marine delivery operations.

The delivery apparatus may further comprise a second disconnect assembly providing a releasable connection between a parachute and the delivery platform and/or the payload.

In some embodiments, the payload comprises an autonomous vehicle.

In some additional embodiments, the payload is provided with a detector device or a timer device, and wherein the payload is also provided with a signal emitter for emitting a signal to a signal receiver of the disconnect assembly.

The disconnect assembly may be configured to release the releasable connection in response to the signal, indicating that the payload should be disconnected from the delivery platform.

According to a further embodiment of the invention there is also provided a method of disconnecting a payload from a delivery platform, using the disconnect assembly, kit of parts, or delivery apparatus as described above.

According to another embodiment of the invention there is also provided a method of disconnecting a payload from a delivery platform, the method including the following steps establishing that the delivery platform is at a delivery location, then using an automatic trigger mechanism to trigger an actuation mechanism, and then using the actuation mechanism to actuate release of a releasable connection between the payload and the delivery platform.

It will of course be appreciated that features described in relation to an embodiment of the present invention may be incorporated into other embodiments of the present invention. For example, the method of the invention may incorporate any of the features described with reference to the apparatus of the invention and vice versa.

Where in the foregoing description, integers or elements are mentioned which have known, obvious or foreseeable equivalents, then such equivalents are herein incorporated as if individually set forth. Reference should be made to the claims for determining the true scope of the present invention, which should be construed to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

It should be noted that throughout this specification, "or" should be interpreted as "and/or".

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An aerial delivery apparatus, comprising:
   an aerial delivery platform;
   a payload attachable to the aerial delivery platform; and
   a disconnect assembly for disconnecting the payload from the delivery platform, the disconnect assembly comprising:
      a disconnect device for providing a releasable connection between the payload and the aerial delivery platform,
      an actuation mechanism for actuating release of the releasable connection, and
      a trigger mechanism for triggering the actuation mechanism to release the releasable connection,
      wherein the trigger mechanism is automated such that the trigger mechanism can trigger the actuation mechanism without requiring a operator intervention at the trigger mechanism.

2. The aerial delivery apparatus as claimed in claim 1, wherein the trigger mechanism comprises a detection device for detecting that the payload should be disconnected from the aerial delivery platform, such that the trigger mechanism can trigger the actuation mechanism in response to such detection.

3. The aerial delivery apparatus as claimed in claim 2, wherein the detection device comprises a motion sensor for detecting that the payload is stationary after being delivered to a delivery location.

4. The aerial delivery apparatus as claimed in claim 1, wherein the trigger mechanism comprises a timer device for timing an elapsed time, such that the trigger mechanism can trigger the actuation mechanism in response to the time elapsed reaching a predetermined set time.

5. The aerial delivery apparatus as claimed in claim 1, wherein the trigger mechanism comprises a signal receiver for receiving a signal that the payload should be disconnected from the aerial delivery platform, such that the trigger mechanism can trigger the actuation mechanism in response to such signal.

6. The aerial delivery apparatus as claimed in claim 1, wherein the disconnect assembly comprises a tension strapping for, under tension, lashing the payload to the aerial delivery platform, the tension strapping being provided with the disconnect device, such that the disconnect device provides the releasable connection to release tension of the strapping.

7. The aerial delivery apparatus as claimed in claim 1, wherein the releasable connection comprises a 3-ring releasable mechanism and wherein the actuation mechanism comprises an actuator for removing an actuator cable from a first ring of the 3-ring releasable mechanism.

8. The aerial delivery apparatus of claim 1, wherein:
   the payload is attached to the aerial delivery platform, and
   the disconnect assembly provides the releasable connection between the payload and the aerial delivery platform.

9. The aerial delivery apparatus as claimed in claim 1, further comprising a delivery mechanism, for attaching to the aerial delivery platform and delivering the aerial delivery platform to a delivery location.

10. The aerial delivery apparatus as claimed in claim 9, wherein the delivery mechanism comprises a parachute.

11. The aerial delivery apparatus as claimed in claim 1, wherein the payload comprises an autonomous vehicle.

12. The aerial delivery apparatus as claimed in claim 1, wherein the payload is provided with a detector device or a timer device, and wherein the payload is also provided with a signal emitter for emitting a signal to a signal receiver of the disconnect assembly.

13. A method comprising
    disconnecting a payload from an aerial delivery platform using a disconnect assembly, wherein the disconnect assembly comprises a disconnect device providing a releasable connection between the payload and the aerial delivery platform, wherein the method includes the following steps:
        establishing that the aerial delivery platform is at a delivery location, then
        using an automatic trigger mechanism to trigger an actuation mechanism without a operator intervention at the trigger mechanism, and then
        using the actuation mechanism to actuate release of the releasable connection between the payload and the aerial delivery platform.

14. The method as claimed in claim 13, further comprising the steps of:
    transporting the aerial delivery apparatus by air in an aircraft;
    extracting the aerial delivery apparatus from the aircraft, wherein the aerial delivery apparatus descends using a parachute whilst the payload is restrained on the aerial delivery platform; and then
    disconnecting the payload from the aerial delivery platform.

* * * * *